United States Patent
Huang et al.

(10) Patent No.: US 11,713,334 B2
(45) Date of Patent: Aug. 1, 2023

(54) METHOD FOR MANUFACTURING SELF-HEALING COMPOSITION, SELF-HEALING COMPOSITION, AND SELF-HEALING FILM

(71) Applicant: Zhen Ding Technology Co., Ltd., Taoyuan (TW)

(72) Inventors: Chi-Fei Huang, Taoyuan (TW); Ho-Hsiu Chou, Hsinchu (TW); Chun-Ming Yeh, Hsinchu (TW); Chun-Hsiu Lin, Hsinchu (TW)

(73) Assignee: Zhen Ding Technology Co., Ltd., Taoyuan (TW)

( * ) Notice: Subject to any disclaimer, the term of this patent is extended or adjusted under 35 U.S.C. 154(b) by 147 days.

(21) Appl. No.: 17/217,076

(22) Filed: Mar. 30, 2021

(65) Prior Publication Data

US 2022/0153770 A1 May 19, 2022

(30) Foreign Application Priority Data

Nov. 13, 2020 (CN) .......................... 202011267561.X (51) Int. Cl.
*C08G 18/38* (2006.01)
*C07F 15/04* (2006.01)
(Continued)

(52) U.S. Cl.
CPC .......... *C07F 15/045* (2013.01); *B29C 73/163* (2013.01); *C08G 18/10* (2013.01);
(Continued)

(58) Field of Classification Search
CPC ............... C08G 18/10; C08G 18/3206; C08G 18/3844; C08G 18/3215; C08G 18/7621;
(Continued)

(56) References Cited

U.S. PATENT DOCUMENTS

2017/0174910 A1* 6/2017 Nowak ................ C08G 18/348

FOREIGN PATENT DOCUMENTS

| CN | 109337087 A | * | 2/2019 | ............. C08G 18/10 |
| CN | 110041491 A | * | 7/2019 | ......... C08G 18/3246 |

(Continued)

OTHER PUBLICATIONS

CN-110041491-07-2019_ENGLISH.*
CN-109337087-02-2019_ENGLISH.*
CN-110698635_01-2020_English Translation.*
(Continued)

*Primary Examiner* — Michael L Leonard
(74) *Attorney, Agent, or Firm* — ScienBiziP, P.C.

(57) ABSTRACT

A method of preparing a self-healing composition is disclosed, the method including following steps. An isocyanate solution, a dihydric alcohol solution, and a metal salt solution are provided. The dihydric alcohol has heterocyclic structures. The isocyanate solution and the dihydric alcohol solution are mixed, causing the isocyanate and the dihydric alcohol polymerize to form a polymer precursor. The polymer precursor includes a hard segment and a soft segment. The hard segment includes urethane groups, the soft segment includes heterocyclic structures. The polymer precursor and the metal salt solution are mixed, causing the heterocyclic structures and metal ions to undergo a chelation reaction to form a coordination complex, thereby forming the self-healing composition. A self-healing composition prepared by the method, and self-healing film using the self-healing composition are also disclosed.

6 Claims, 10 Drawing Sheets

(51) Int. Cl.
<table>
<tr><td>B29C 73/16</td><td>(2006.01)</td></tr>
<tr><td>C08G 18/32</td><td>(2006.01)</td></tr>
<tr><td>C08G 18/10</td><td>(2006.01)</td></tr>
<tr><td>C08G 18/48</td><td>(2006.01)</td></tr>
<tr><td>C08G 18/83</td><td>(2006.01)</td></tr>
<tr><td>C08G 18/66</td><td>(2006.01)</td></tr>
<tr><td>C08G 18/76</td><td>(2006.01)</td></tr>
</table>

(52) U.S. Cl.
CPC ..... *C08G 18/3206* (2013.01); *C08G 18/3215* (2013.01); *C08G 18/3844* (2013.01); *C08G 18/48* (2013.01); *C08G 18/4825* (2013.01); *C08G 18/6666* (2013.01); *C08G 18/7621* (2013.01); *C08G 18/838* (2013.01)

(58) Field of Classification Search
CPC ............ C08G 18/4825; C08G 18/6666; C08G 18/48; C08G 18/838
See application file for complete search history.

(56) References Cited

FOREIGN PATENT DOCUMENTS

<table>
<tr><td>CN</td><td>110240689 A</td><td></td><td>9/2019</td><td></td></tr>
<tr><td>CN</td><td>110698635 A</td><td>*</td><td>1/2020</td><td>............ C08G 18/12</td></tr>
<tr><td>CN</td><td>111217985 A</td><td></td><td>6/2020</td><td></td></tr>
</table>

OTHER PUBLICATIONS

"A highly stretchable autonomous self-healing elastomer" to Cheng-Hui et al. Nature Chemistry vol. 8, Jun. 2016, p. 618-624.*

* cited by examiner

Scratch

FIG. 3A

Scratch is self-healed

FIG. 3B

Scratch

FIG. 4A

Scratch is self-healed

FIG. 10 a# METHOD FOR MANUFACTURING SELF-HEALING COMPOSITION, SELF-HEALING COMPOSITION, AND SELF-HEALING FILM

FIELD

The subject matter herein generally relates to a method for manufacturing a self-healing composition, a self-healing composition, and a self-healing film.

BACKGROUND

Flexible and wearable electronic devices are widely used in monitoring human activities and personal health. Such electronic device includes a base film that may be skin-friendly and transparent.

However, the film may be easily scratched and worn by external impacts, which may be difficult to recover to its original state. Thus, a self-healing film is needed. The self-healing film may include microcapsules, which break and release a repair agent to allow the film to recover to its original state. However, once the microcapsules are broken, the processes are irreversible. Therefore, the microcapsules can only be used for one time. Moreover, the self-healing film may not meet the requirements of excellent transparency and high mechanical properties at the same time.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

Figure 1:
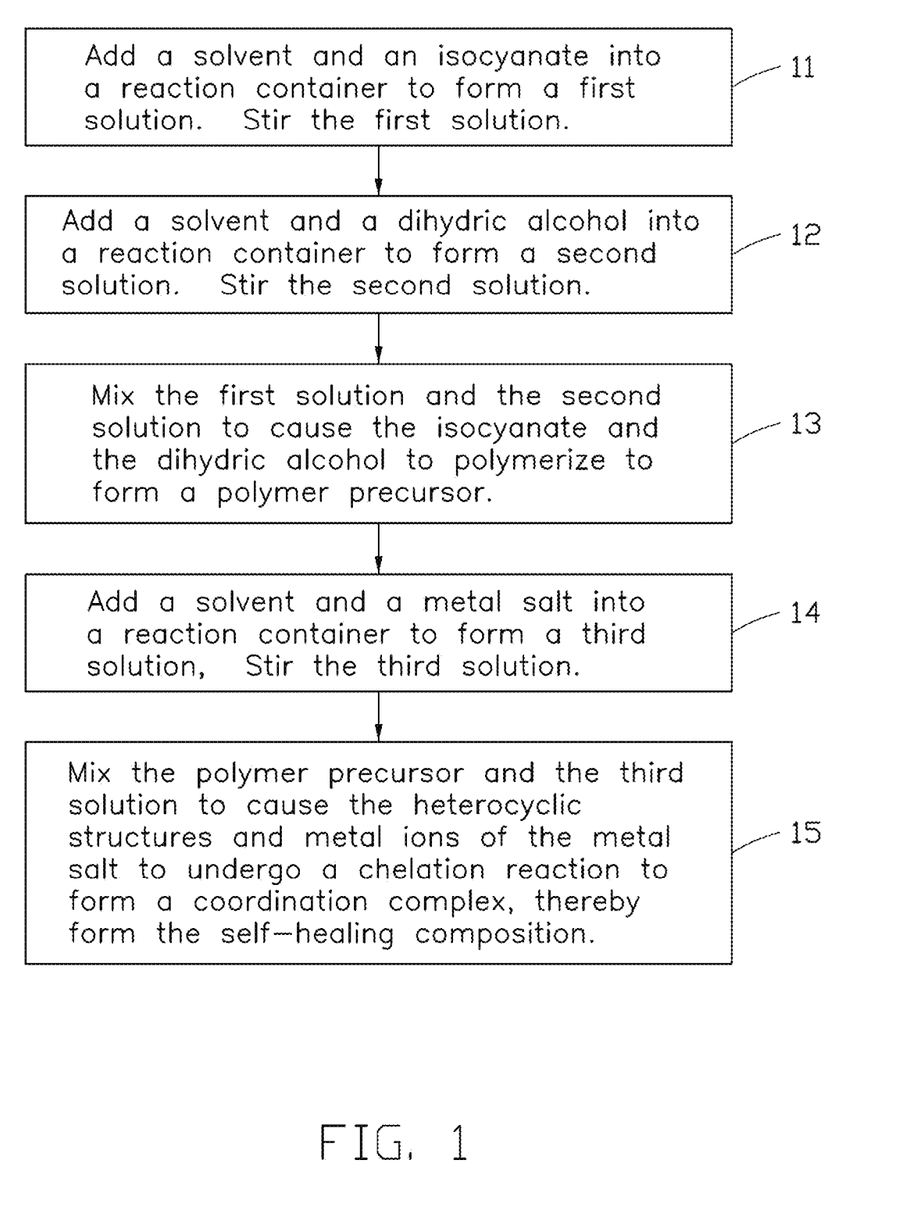
FIG. 1 is a flowchart of a method for manufacturing a self-healing composition according to the present disclosure.

FIG. 1 illustrates a flowchart of a method for manufacturing a self-healing dispersion according to an embodiment. The method for manufacturing the self-healing composition is provided by way of example, as there are a variety of ways to carry out the method. The method can begin at block 11.

Block 11, a solvent and isocyanate are added into a reaction container to form a first solution. The first solution is stirred.

In an embodiment, the isocyanate has a mass ratio of 75% to 85% in the first solution.

In an embodiment, the isocyanate comprises at least one of an aliphatic isocyanate, an alicyclic isocyanate, an aromatic diisocyanate, and any combination thereof.

In an embodiment, the aliphatic isocyanate may be, but is not limited to, trimethylene diisocyanate, tetramethylene diisocyanate, hexamethylene diisocyanate, pentamethylene diisocyanate, 1,2-propylidene diisocyanate, 1,3-butylene diisocyanate, dodecylene diisocyanate, 2,4,4-trimethyl hexamethylene diisocyanate, 1,3-cyclopentyl diisocyanate, and 1,3-cyclohexane diisocyanate.

In an embodiment, the alicyclic isocyanate may be, but is not limited to, 1,4-cyclohexane diisocyanate, isophorone diisocyanate, hydrogenated diphenylmethane diisocyanate, hydrogenated phenylene methylene diisocyanate, hydrogenated toluene diisocyanate and hydrogenated tetramethylbenzene dimethyl diisocyanate.

In an embodiment, the aromatic diisocyanate may be, but is not limited to, phenylene diisocyanate, 2,4-toluene diisocyanate, 2,6-toluene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and phenylenemethylene diisocyanate.

In an embodiment, the solvent is a polar solvent, which may be tetrahydrofuran (THF).

Block 12, a solvent and dihydric alcohol are added into a reaction container to form a second solution. The second solution is stirred.

In an embodiment, the dihydric alcohol has a mass ratio of 85% to 95% in the second solution.

In an embodiment, the dihydric alcohol has heterocyclic structures.

In an embodiment, the heterocyclic structure may be, but is not limited to, pyridine, pyrazole, thiophene, and imidazole.

In an embodiment, the heterocyclic structure comprises at least one of azo heterocyclic pyridine, alkyl pyridine, halogenated pyridine, aminopyridine, bromopyridine, methylpyridine, iodopyridine, chloropyridine, hydroxypyridine, pyrazol, ethyl pyridine, bipyridine, imidazole, pyrazole, thiophene, and any combination thereof.

In an embodiment, the solvent is a polar solvent, which may be tetrahydrofuran (THF).

Block 13, the first solution and the second solution are mixed to cause the isocyanate and the dihydric alcohol polymerize to form a polymer precursor.

The polymer precursor has a molecular chain which comprises a hard segment and a soft segment. The hard segment comprises urethane groups. The soft segment comprises the heterocyclic structures.

In an embodiment, the first solution is heated at 40 Celsius degrees to 70 Celsius degrees in a water bath. The second solution is added into the first solution slowly to form a mixture. The isocyanate and the dihydric alcohol polymerize in the mixture for 10 h to 15 h to form the polymer precursor.

In an embodiment, the first solution is heated at 60 Celsius degrees in a water bath. The second solution is added into the first solution slowly to form a mixture. The isocyanate and the dihydric alcohol polymerize in the mixture for 12 h to form the polymer precursor.

Block 14, a solvent and a metal salt are added into a reaction container to form a third solution. The third solution is stirred.

In an embodiment, the metal salt has a mass ratio of 20% to 30% in the third solution.

In an embodiment, the metal salt comprises a transition metal ion.

In an embodiment, the metal ion comprises at least one of zinc ion, ferric ion, nickel ion, cupric ion, and any combination thereof.

In an embodiment, an anion in the metal salt may be, but is not limited to, $CF_3SO_3^-$, $NO_3^-$, $SO_4^{2-}$, and $Cl^-$.

Block 15, the polymer precursor and the third solution are mixed to cause the heterocyclic structures and metal ions of the metal salt to undergo a chelation reaction to form a coordination complex, thereby form a self-healing composition.

In an embodiment, the third solution is added into the polymer precursor to form a mixture. The mixture is heated under room temperature for 4 h to 8 h to form the self-healing dispersion.

The present disclosure further provides a self-healing composition comprising a molecular chain. The molecular chain comprises the hard segment and the soft segment.

The hard segment comprises urethane groups. The soft segment comprises the heterocyclic structure and the metal ion. The heterocyclic structure and the metal ion cooperatively form the coordination complex.

In an embodiment, the hard segment in the molecular chain of the self-healing composition may be, but is not limited to, a urethane structure. The urethane structure comprises an amino group (—NH—CO—). The amino groups between two different molecular chains may form intermolecular hydrogen bonds. The intermolecular hydrogen bonds provide tensile recovery stability and self-healing property for the self-healing composition. The soft segment in the molecular chain of the self-healing composition may be, but is not limited to, a polyether structure. The polyether structure provides flexibility and weather resistance for the self-healing composition.

In an embodiment, the self-healing composition is polymerized by diisocyanate and dihydric alcohol. The dihydric alcohol comprises the heterocyclic structure. The reaction process is as follows.

Referring to the above reaction process, when the metal salt is added into the polymer precursor, the heterocyclic structures and metal ions of the metal salt undergo a chelation reaction to form a coordination bond. The coordination bond which is a dynamic bond may provide self-healing property for the self-healing composition. The coordination bond can also improve the mechanical properties and chemical stability of the self-healing composition. For example, for $Zn^{2+}$ or other metal ions in d10 transition metal area, a d-orbital of the metal ion is full of electrons, it is more efficient in transferring energy and electrons than the metal with valence electrons. No oxidation or reduction reaction generated in the central metal when the d-orbital of the metal ion is full of electrons, which may improve the chemical stability of the self-healing composition.

In an embodiment, the amount of the coordination bonds can be controlled by adjusting the ratio of the heterocyclic structure with respect to the metal ion. The mechanical strength and ductility of the self-healing composite can be controlled by adjusting the amount of the coordination bonds. When the amount of the coordination bonds are too small, insufficient mechanical stress is resulted. When the amount of the metal coordination bonds is too many, metal saturation and impurities are resulted. A ratio of a number of the heterocyclic structures and a number of the metal ions is in a range of 1:0.01 to 1:0.9. Preferably, a ratio of a number of the heterocyclic structures and the number of the metal ions is in a range of 1:0.1 to 1:0.7.

Hydrogen bonds and coordination bonds are formed between different moleculars of the self-healing composition. The hydrogen bonds and the coordination bonds provide the self-healing ability for the self-healing composition. The hydrogen bonds are easy to form. For example, intermolecular hydrogen bonds and intramolecular hydrogen bonds are all easy to form. The self-healing mechanism of the self-healing composition is that the hydrogen bonds and the coordination bonds can be scratched by external stress and re-bonded many times by themselves. Once the hydrogen bonds and the coordination bonds are broken again, the processes are reversible. The self-healing composition can be recycled. Moreover, the coordination bonds may also improve the mechanical strength, mechanical stability and water absorption capacity of the self-healing composition.

The present disclosure further provides a self-healing film, which comprises the self-healing composition.

In an embodiment, the self-healing film is formed by coating, spraying, injection, and molding.

In an embodiment, the self-healing film is formed by molding.

Figure 2:
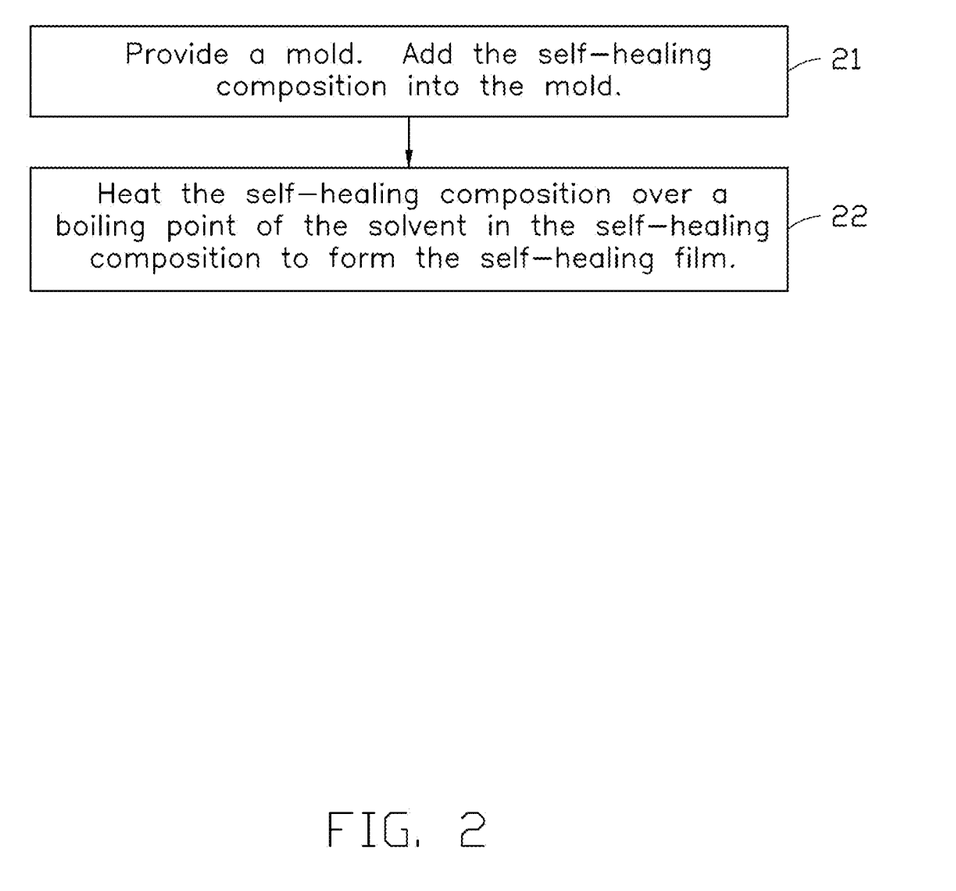
FIG. 2 is a flowchart of a method for manufacturing a self-healing film comprising a self-healing composition.

FIG. 2 illustrates a flowchart of a method for manufacturing the self-healing film according to an embodiment. The method for manufacturing the self-healing film is provided by way of example, as there are a variety of ways to carry out the method. The method can begin at block 21.

Block 21, a mold is provided. The self-healing composition is added into the mold.

In an embodiment, the mold is made of Teflon.

Block 22, the self-healing composition is heated over a boiling point of the solvent in the self-healing composition to form the self-healing film.

The present disclosure further provides a device including the self-healing film.

The device may be a foldable display, for example, a surface modification film, a laminating film, and an electronic skin.

The self-healing composition according to an embodiment and a self-healing film comprising the self-healing composition, have excellent self-healing characteristics which facilitate recovery from the scratched state to the original state, and also have sufficient flexibility to be applied to a foldable device, as well as excellent hardness and transparency.

Example 1

4,4'-Bis(hydroxymethyl)-2,2'-bipyridine (bpy, 100 mg) and THF (20 ml) were added into a 500 ml container to form a first solution. The first solution was heated under 60 Celsius degrees in a water bath. Poly(propylene glycol), tolylene 2,4-diisocyanate terminated (PTD, 2.12 g) and THF (20 ml) were mixed to form a second solution. The second solution was added into the first solution slowly to form a first mixture. The first mixture reacted for 12 h to form a polymer precursor (bpyPTD).

The bpyPTD (2.0 g) and THF (20 ml) were mixed to form another mixture. The second mixture (3 ml) which contain 600 mg bpyPTD was added into a container. $Zn(OTf)_2$ (15 mg) and THF (5 ml) were mixed to form a third solution. The third solution was added slowly into the bpyPTD to cause the heterocyclic structures and metal ions of the metal salt to undergo a chelation reaction under room temperature for 6 h to form a self-healing composition (ZnpyPTD).

The ZnpyPTD was added into a Teflon mold, then the ZnpyPTD was cured to form a self-healing film.

Example 2

4,4'-Bis(hydroxymethyl)-2,2'-bipyridine (bpy, 100 mg) and THF (20 ml) were added into a 500 ml container to form a first solution. The first solution was heated under 60 Celsius degrees in a water bath. Poly(propylene glycol), tolylene 2,4-diisocyanate terminated (PTD, 2.12 g) and THF (20 ml) were mixed to form a second solution. The second solution was added into the first solution slowly to form a first mixture. The first mixture reacted for 12 h to form a polymer precursor (bpyPTD).

The bpyPTD (2.5 g) and THF (20 ml) were mixed to form a second mixture. The mixture (2 ml) which contain 500 mg bpyPTD was added into a container. $Zn(OTf)_2$ (28 mg) and THF (10 ml) are mixed to form a third solution. The third solution was added slowly into the bpyPTD to cause the heterocyclic structures and metal ions of the metal salt to undergo a chelation reaction under room temperature for 6 h to form a self-healing composition (ZnpyPTD).

The ZnpyPTD was added into a Teflon mold, then the ZnpyPTD was cured to form a self-healing film.

Figure 3A:
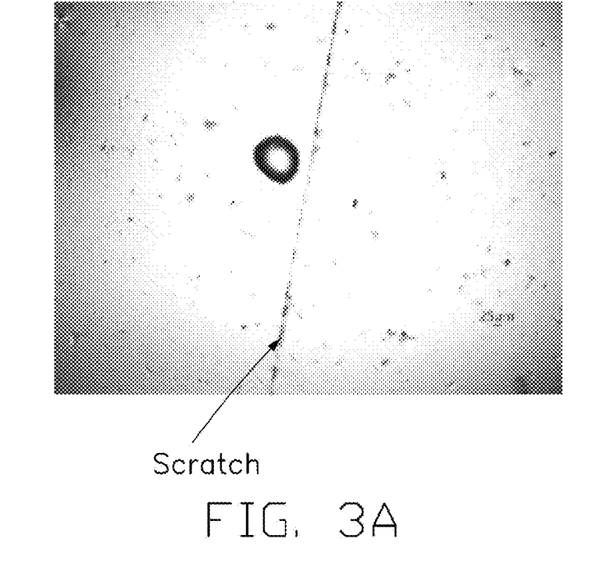
FIG. 3A and FIG. 3B are images showing a self-healing process of a self-healing film under room temperature.
Figure 3B:
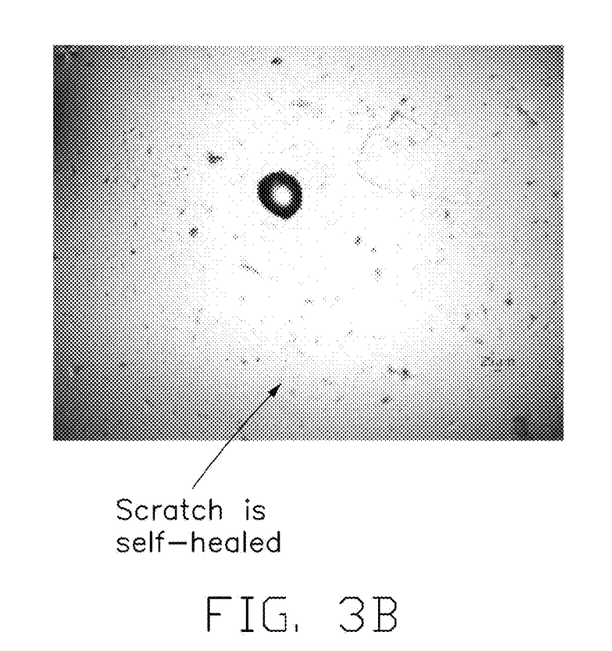

FIG. 3A and FIG. 3B are images showing a self-healing process of the self-healing film with optical microscope (OM) under room temperature. At room temperature, the self-healing film recovery from the scratched state (FIG. 3A) to the original state (FIG. 3B) after 1 hour to 2 hours. Thus, the self-healing film has the characteristics of self-healing.

Figure 4A:
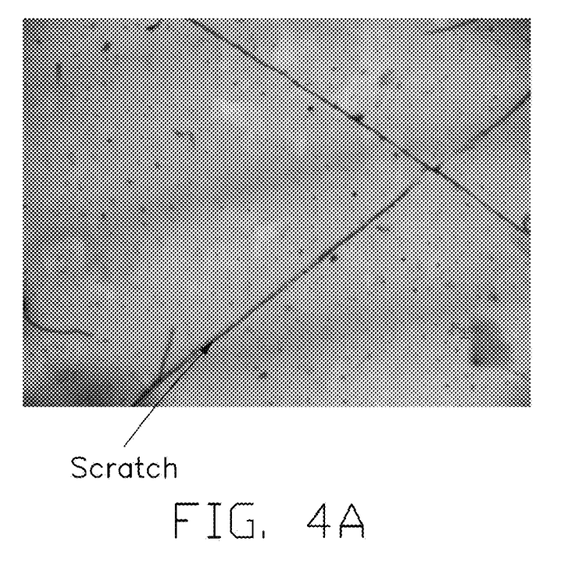
FIG. 4A and FIG. 4B are images showing a self-healing process of a self-healing film when heated.
Figure 4B:
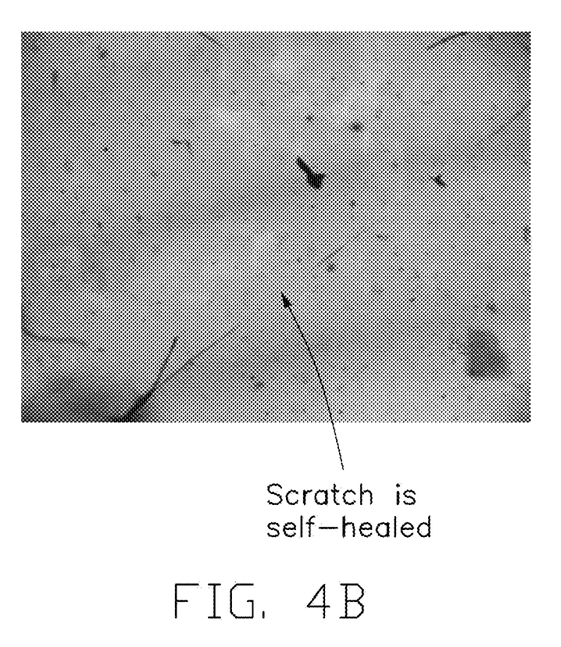

FIG. 4A and FIG. 4B are images showing a self-healing process of the self-healing film with optical microscope (OM) when heated. The self-healing film recovery from the scratched state (FIG. 4A) to the original state (FIG. 4B) at 80 Celsius degrees after 2 min. When heated, the reaction rate of dynamic bonding increases due to the conversion of thermal energy into kinetic energy, thus accelerating the self-healing ability for the self-healing film.

Figure 5:
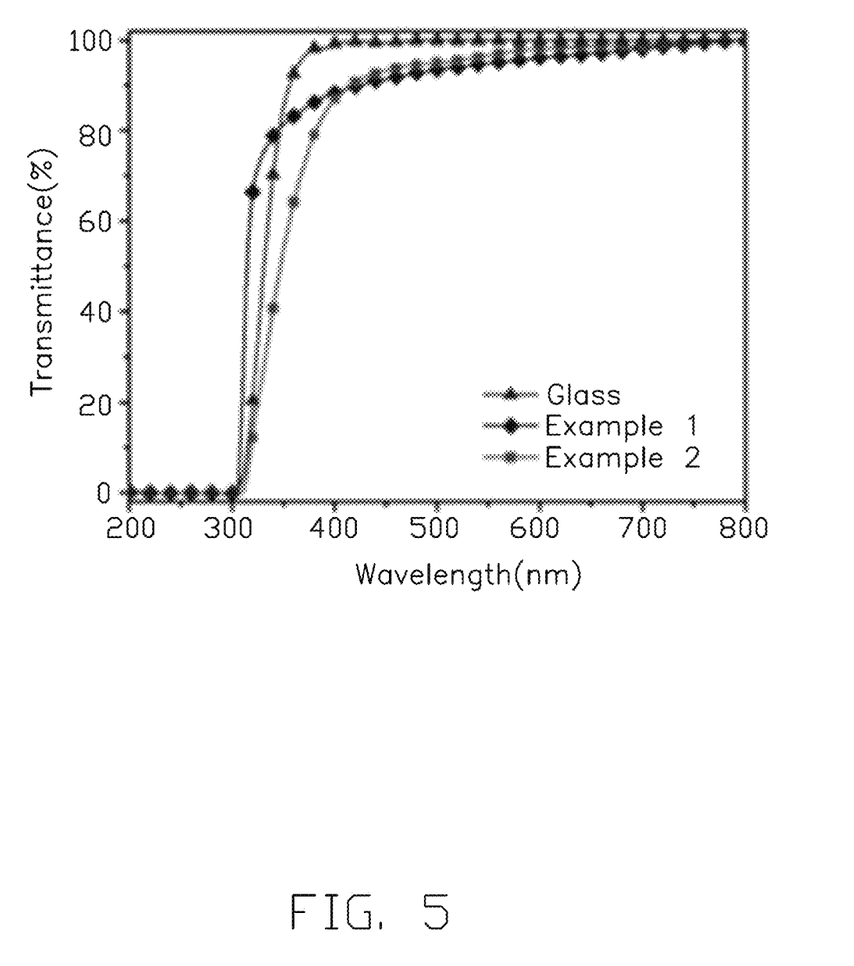
FIG. 5 is a diagram of transmittances of a glass and two self-healing films of Examples 1 and 2 under different wavelengths.

FIG. 5 is a diagram of transmittances of a glass and two self-healing films of Examples 1 and 2 under different wavelengths. The UV-vis spectrum is obtained from a UV-Visible Scanning Spectrophotometer. In a visible light wavelength ranges from 400 nm to 700 nm, the self-healing films of Example 1 and Example 2 have transmittance greater than or equal to 90%. The transmittance of the self-healing film is similar to that of a glass. Moreover, when the self-healing film is immersed in water, no atomization or whitening is generated, and the transparence remains unchanged after drying. Thus, the water resistance of the self-healing film is good.

Figure 6:
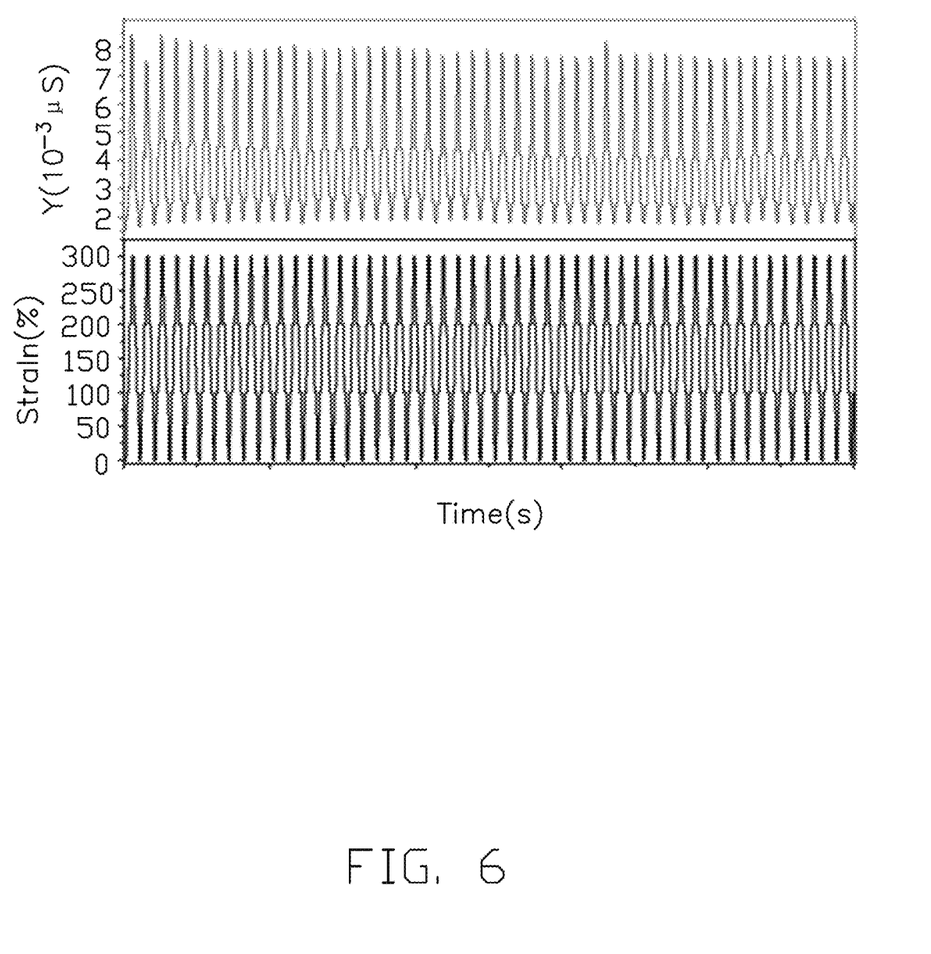
FIG. 6 is a diagram of cyclic tensile test of a self-healing film of Example 1.

FIG. 6 is a diagram of cyclic tensile test of the self-healing film of Example 1. The upper figure in FIG. 6 shows the relationship between time and electrical conductivity (Y), and the lower figure in FIG. 6 shows the relationship between time and strain. The original length of the self-healing film is N, the strain is from 0 to 300%, and the thickness of the self-healing film is N/5. The cyclic tensile test is conducted 100 times per unit time. It can be seen from the curve of the relationship between time and electrical conductivity that the self-healing film is stable. The electrical conductivity value is stable during repeated stretching. It can be seen from the curve of time and strain that the self-healing film has good mechanical properties after repeated stretching. The test results show that the self-healing film still has good resilience and fatigue resistance after repeated tests.

Figure 7:
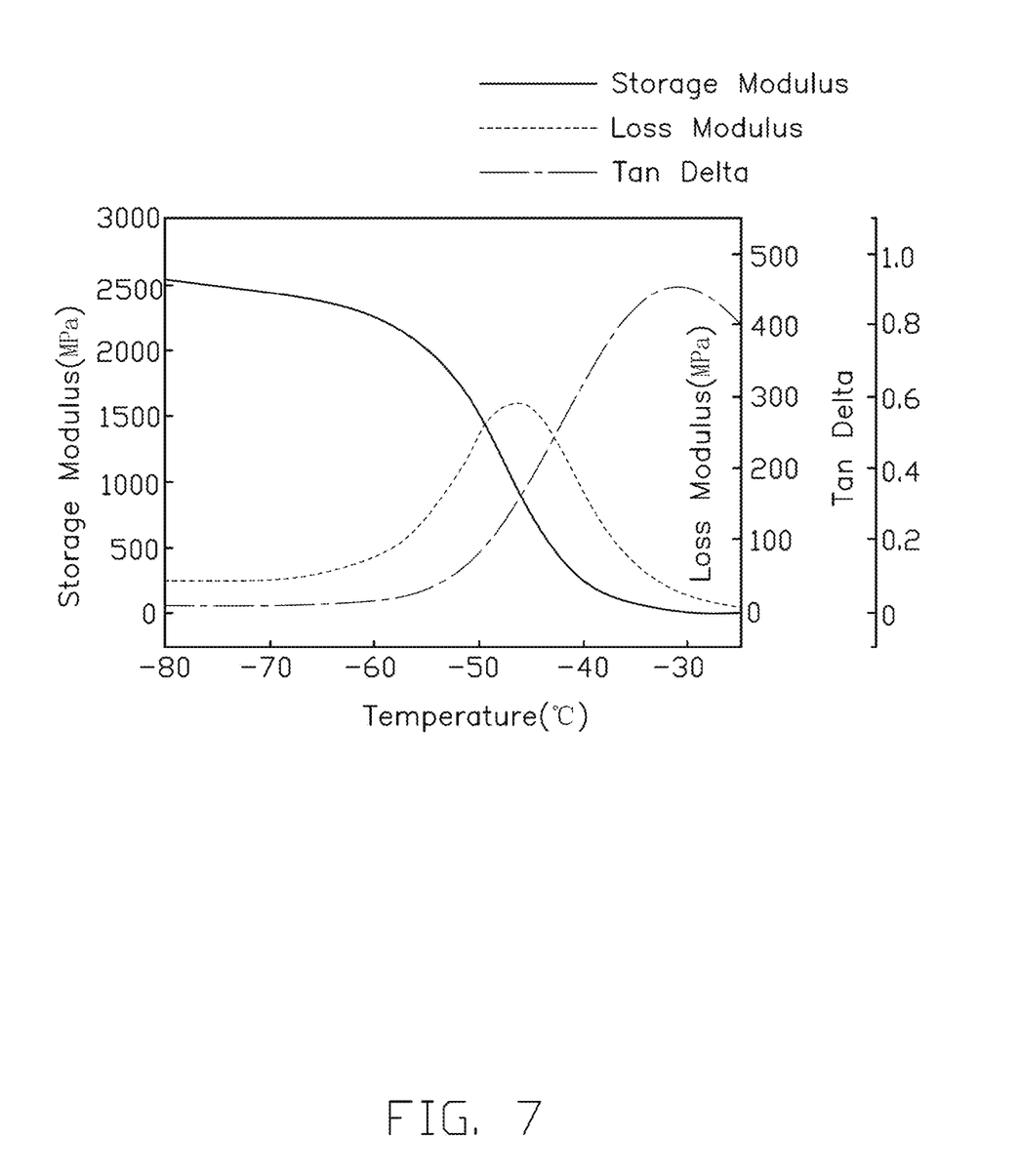
FIG. 7 is a diagram of dynamic mechanical analysis (DMA) of a self-healing film of Example 1.

FIG. 7 is a diagram of dynamic mechanical analysis (DMA) of a self-healing film of Example 1. A glass transition temperature of the self-healing film is about −32° C., so the self-healing film is soft, foldable, and flexible at room temperature.

Figure 8:
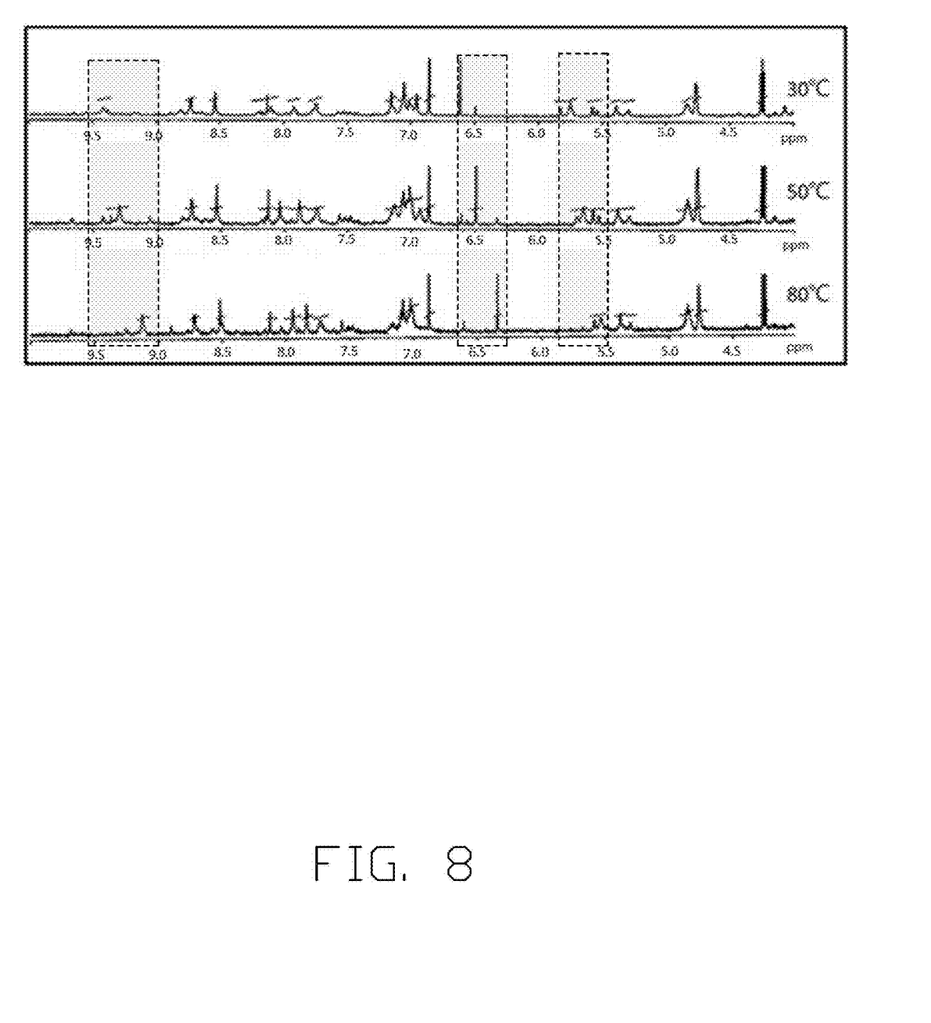
FIG. 8 is a $^1$H-NMR spectrum of a self-healing film of Example 1 under different temperatures.

FIG. 8 is a $^1$H-NMR spectrum of a self-healing film of Example 1 under different temperatures. The hydrogen bond in the self-healing film is very sensitive to heat. The rising of temperature causes the thermal vibration of the hydrogen bond, which causes the shift of the peak in FIG. 8. Therefore, the NMR results show that hydrogen bonds exist in the self-healing film. Even if the application environment changes (for example, different temperatures) or the self-healing film is in the flow state, the hydrogen bonds still exist. Thus, the hydrogen bonds in the self-healing film can improve the ability of self-healing.

Figure 9:
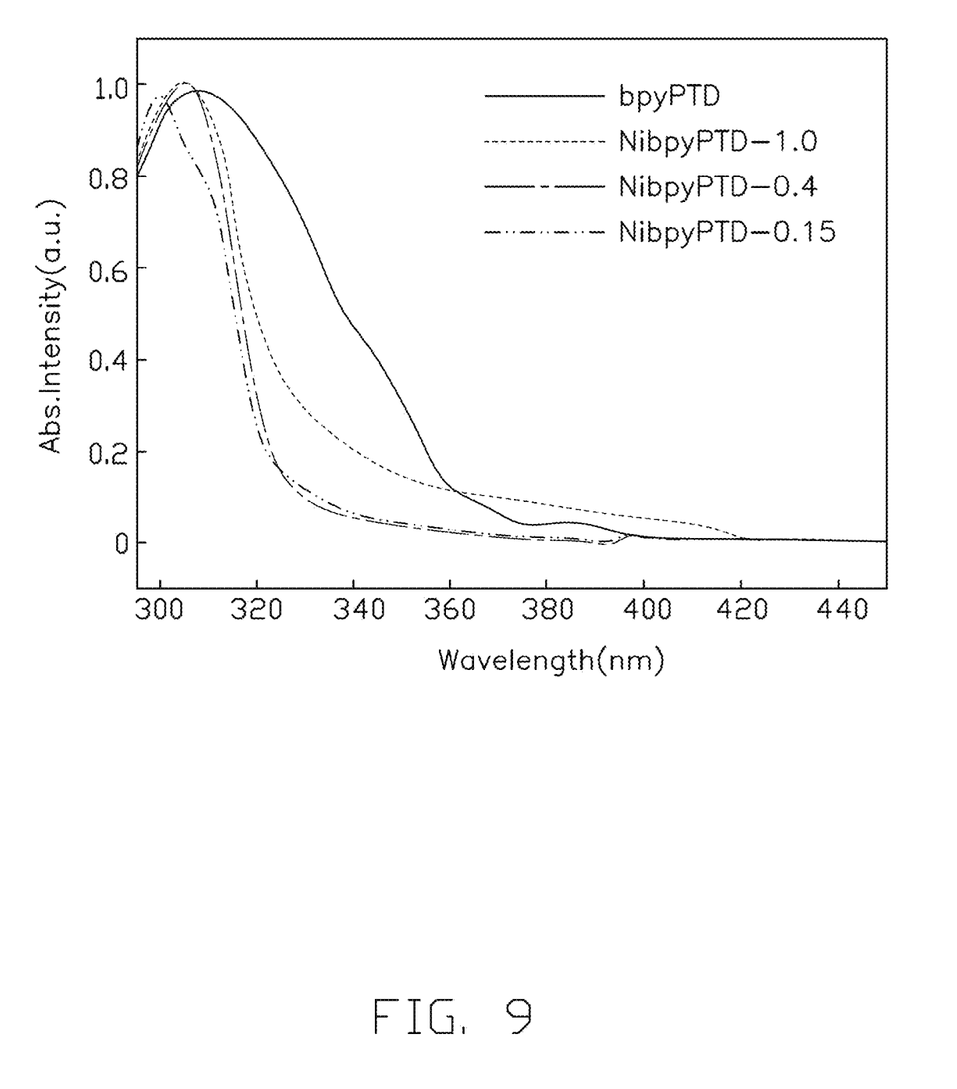
FIG. 9 is a diagram of absorption intensities of a self-healing film of Example 1 with different contents of Ni.

FIG. 9 is a diagram of absorption intensities of a self-healing film of Example 1 with different contents of Ni. The peak pattern of Ni changes with the increase of the amount of Ni.

Figure 10:
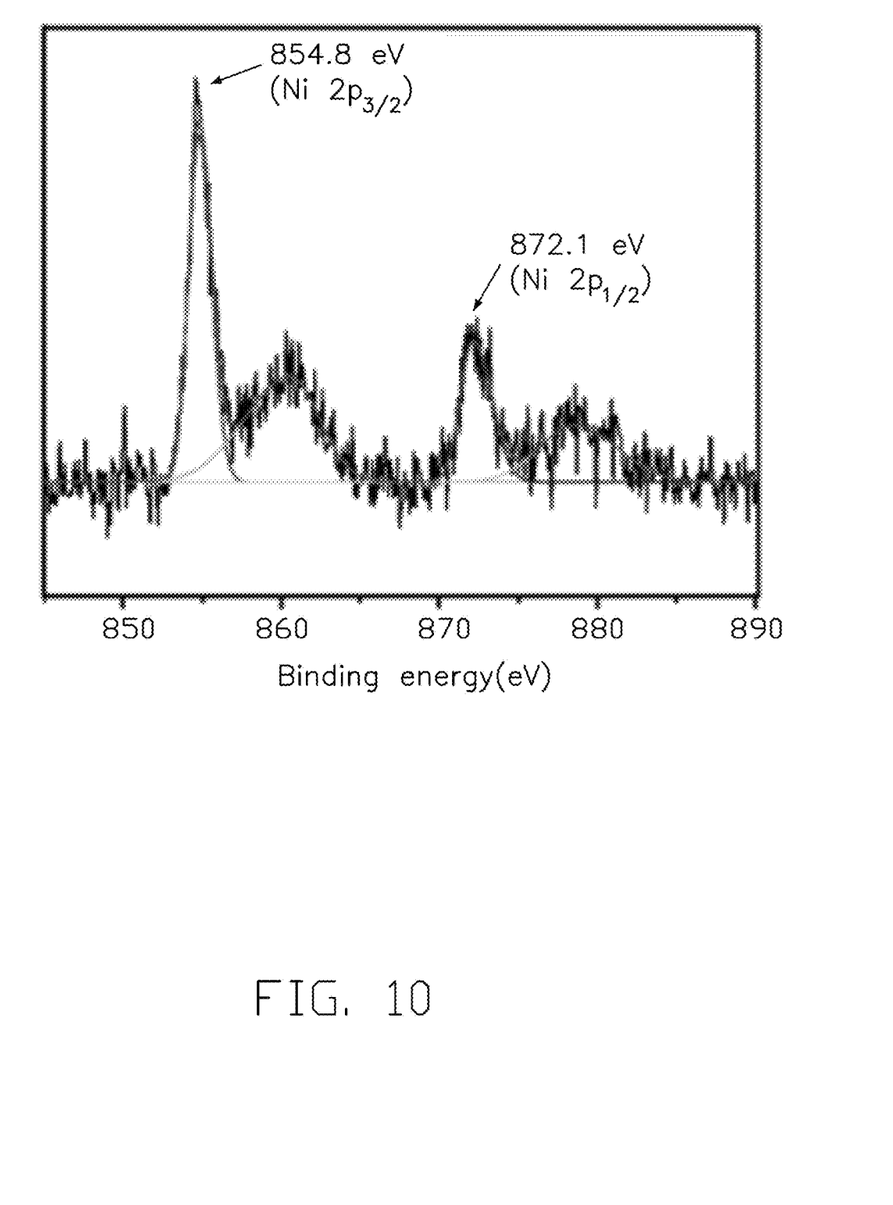
FIG. 10 is X-ray photoelectron spectroscopy (XPS) of a self-healing film of Example 1.

FIG. 10 is X-ray photoelectron spectroscopy (XPS) of a self-healing film of Example. Ni has characteristic peaks at 854.8 eV and 872.1 eV, which represents $2p_{3/2}$ and $2p_{1/2}$ respectively. The characteristic peaks represent the generation of metal coordination bonds in self-healing film.

From the results of absorption intensities and XPS spectrum, coordination bond is generated in the self-healing film of Example 1. The existence of coordination bond in the self-healing film will change the absorption wavelength and intensity in UV-visible absorption spectra. Taking chelated Ni as an example, the self-healing film with coordination bond has obvious blue shift.

In summary, the self-healing composition of the self-healing film comprising the self-healing composition, have excellent self-healing characteristics which facilitate recovery from the scratched state to the original state, and also have sufficient flexibility to be applied to a foldable device, as well as excellent hardness and transparency.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method of preparing a self-healing composition, comprising:
   providing a first solution, the first solution comprising an isocyanate, the isocyanate having a mass ratio of 75% to 85% in the first solution;
   providing a second solution, the second solution comprising a dihydric alcohol, the dihydric alcohol having heterocyclic structures, and the dihydric alcohol having a mass ratio of 85% to 95% in the second solution;
   mixing the first solution and the second solution, causing the isocyanate and the dihydric alcohol polymerize to form a polymer precursor, the polymer precursor having a molecular chain which comprising a hard segment and a soft segment, the hard segment comprising urethane groups, the soft segment comprising the heterocyclic structures;
   providing a third solution, the third solution comprising a metal salt, the metal salt having a mass ratio of 20% to 30% in the third solution; and
   mixing the polymer precursor and the third solution, causing the heterocyclic structures and metal ions of the metal salt to undergo a chelation reaction to form a coordination complex, thereby forming the self-healing composition.

2. The method of claim 1, wherein a ratio of a number of the heterocyclic structures and a number of the metal ions is in a range of 1:0.01 to 1:0.9.

3. The method of claim 2, wherein a ratio of a number of the heterocyclic structures and a number of the metal ions is in a range of 1:0.1 to 1:0.7.

4. The method of claim 1, wherein the isocyanate comprises at least one of an aliphatic isocyanate, an alicyclic isocyanate, an aromatic diisocyanate, and any combination thereof.

5. The method of claim 1, wherein the heterocyclic structure comprises at least one of azo heterocyclic pyridine, alkyl pyridine, halogenated pyridine, aminopyridine, bromopyridine, methylpyridine, iodopyridine, chloropyridine, hydroxypyridine, pyrazol, ethyl pyridine, bipyridine, imidazole, pyrazole, thiophene, and any combination thereof.

6. The method of claim 1, wherein the metal ion comprises at least one of zinc ion, ferric ion, nickel ion, cupric ion, and any combination thereof.

* * * * *